US009779562B1

(12) United States Patent
Cook et al.

(10) Patent No.: US 9,779,562 B1
(45) Date of Patent: Oct. 3, 2017

(54) SYSTEM FOR AUTOMATICALLY CHARACTERIZING A VEHICLE

(71) Applicant: Lytx, Inc., San Diego, CA (US)

(72) Inventors: Bryon Cook, San Diego, CA (US); Quoc Chan Quach, San Diego, CA (US)

(73) Assignee: Lytx, Inc., San Diego, CA (US)

( * ) Notice: Subject to any disclaimer, the term of this patent is extended or adjusted under 35 U.S.C. 154(b) by 0 days.

(21) Appl. No.: 14/976,399

(22) Filed: Dec. 21, 2015

(51) Int. Cl.
*G01M 17/00* (2006.01)
*G06F 7/00* (2006.01)
*G07C 5/08* (2006.01)
*G07C 5/02* (2006.01)

(52) U.S. Cl.
CPC ............. *G07C 5/0808* (2013.01); *G07C 5/02* (2013.01)

(58) Field of Classification Search
CPC ...... G07C 5/008; G07C 5/085; G07C 5/0808; G07C 5/02; G07C 9/00158; G07C 5/00; G07C 9/00126; G07C 5/0825; G07C 5/006; G07C 5/0833; G07C 5/0816; G07C 5/08; G07C 5/0891; G07C 5/0841; G07C 5/0858; G07C 2205/02; G07C 5/12
See application file for complete search history.

(56) References Cited

U.S. PATENT DOCUMENTS 7,565,230 B2 * 7/2009 Gardner ................. G09B 9/052 180/272
8,930,072 B1 * 1/2015 Lambert .............. G07C 5/0866 348/222.1
8,952,819 B2 * 2/2015 Nemat-Nasser ..... B60K 28/066 340/425.1
9,020,697 B2 * 4/2015 Ricci ..................... H04W 48/04 701/36
9,158,962 B1 * 10/2015 Nemat-Nasser ... G06K 9/00845
9,235,750 B1 * 1/2016 Sutton ................ G06K 9/00845
9,238,467 B1 * 1/2016 Hoye .................... B60W 50/14
9,341,487 B2 * 5/2016 Bonhomme ........... G01C 21/26
9,344,683 B1 * 5/2016 Nemat-Nasser ........ B60R 11/04
9,384,609 B2 * 7/2016 Ricci ......................... B60Q 1/00
9,389,147 B1 * 7/2016 Lambert ............. G01M 17/007
9,418,488 B1 * 8/2016 Lambert ................ G07C 5/008
9,424,751 B2 * 8/2016 Hodges
9,428,195 B1 * 8/2016 Surpi .................... B60W 40/09
9,443,358 B2 * 9/2016 Breed ........................ G06F 8/65
9,466,161 B2 * 10/2016 Ricci .................... G06Q 30/012
9,524,597 B2 * 12/2016 Ricci .................. G07C 9/00126
2009/0063026 A1 * 3/2009 Laubender ........... B60K 5/1283 701/111
2013/0102283 A1 * 4/2013 Lau ....................... H04W 12/06 455/411
2014/0285329 A1 * 9/2014 Lee .......................... G08B 6/00 340/407.1
2015/0217728 A1 * 8/2015 Iwai ...................... B60R 25/305 701/1

(Continued)

Primary Examiner — Nicholas Kiswanto
Assistant Examiner — Kenny A Taveras
(74) *Attorney, Agent, or Firm* — Van Pelt, Yi & James LLP

(57) ABSTRACT

A system for automatic characterization of a vehicle includes an input interface and a processor. The input interface is for receiving sensor data. The processor is for determining a vehicle characterization based at least in part on the sensor data and determining a vehicle identifier based at least in part on the vehicle characterization.

20 Claims, 11 Drawing Sheets

(56) References Cited

U.S. PATENT DOCUMENTS

| | | | | |
|---|---|---|---|---|
| 2015/0363983 | A1* | 12/2015 | Cunnings ............ | G01M 17/007<br>701/29.1 |
| 2016/0052546 | A1* | 2/2016 | Arakane .............. | B62D 15/025<br>701/41 |
| 2016/0104374 | A1* | 4/2016 | Ypma ................. | G07C 9/00007<br>340/5.25 |

* cited by examiner

SYSTEM FOR AUTOMATICALLY CHARACTERIZING A VEHICLE

BACKGROUND OF THE INVENTION

Modern vehicles (e.g., airplanes, boats, trains, cars, trucks, etc.) can include a vehicle event recorder in order to better understand the timeline of an anomalous event (e.g., an accident). A vehicle event recorder typically includes a set of sensors, e.g., video recorders, audio recorders, accelerometers, gyroscopes, vehicle state sensors, GPS (global positioning system), etc., that report data, which is used to determine the occurrence of an anomalous event. Sensor data can then be transmitted to an external reviewing system. Anomalous event types include accident anomalous events, maneuver anomalous events, location anomalous events, proximity anomalous events, vehicle malfunction anomalous events, driver behavior anomalous events, or any other anomalous event types. However, some situations and processing need information regarding the vehicle.

BRIEF DESCRIPTION OF THE DRAWINGS

Various embodiments of the invention are disclosed in the following detailed description and the accompanying drawings.

DETAILED DESCRIPTION

Figure 1:
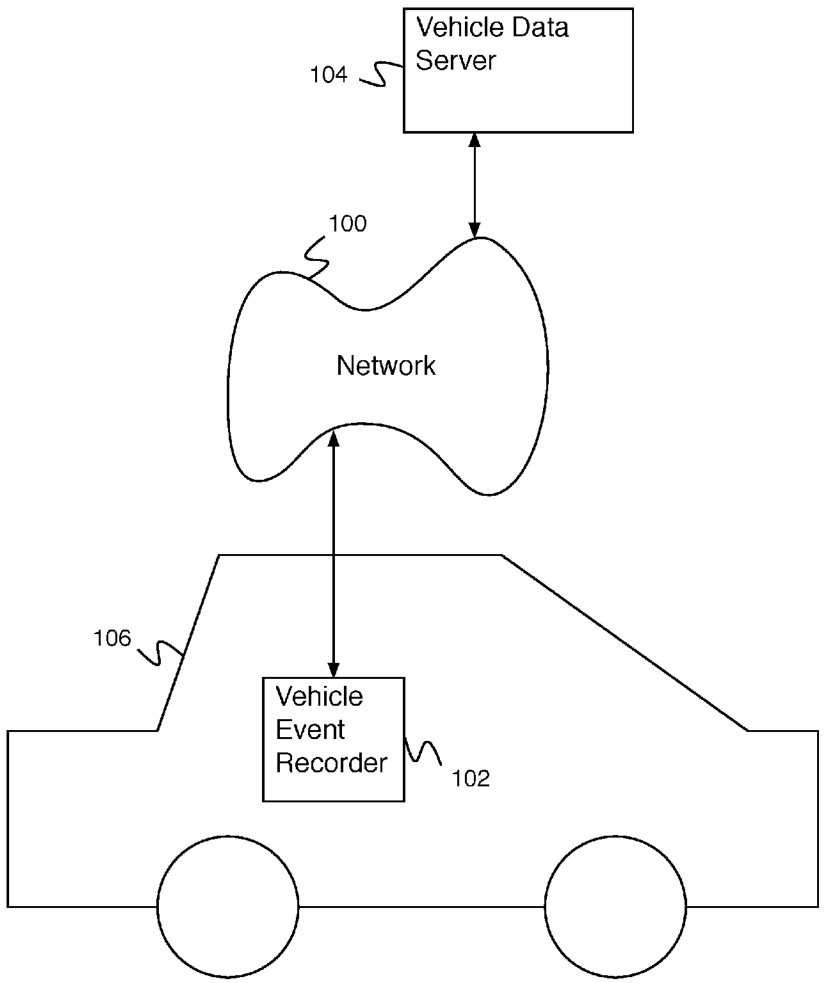
FIG. 1 is a block diagram illustrating an embodiment of a system including a vehicle event recorder.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term ‘processor’ refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for automatic characterization of a vehicle comprises an input interface for receiving sensor data and a processor for determining a vehicle characterization based at least in part on the sensor data and determining a vehicle identifier based at least in part on the vehicle characterization. In some embodiments, the processor is coupled to a memory, which is configured to provide the processor with instructions.

In some embodiments, a system for automatic characterization of a vehicle comprises a vehicle event recorder comprising a processor and a memory. The vehicle event recorder is coupled to a set of sensors (e.g., audio sensors, video sensors, accelerometers, gyroscopes, global positioning system sensors, vehicle state sensors, etc.) for recording vehicle data. The vehicle event recorder records vehicle data and determines a vehicle characterization comprising a set of parameters describing the vehicle from the vehicle data. In various embodiments, the parameters comprise a physical profile, a mechanical profile, an audio profile, a usage profile, or any other appropriate parameters. The parameters are then used to determine a vehicle identifier using a machine learning algorithm. The machine learning algorithm is trained using sets of vehicle characterization data coupled with the known correct vehicle identifier. In some embodiments, the machine learning algorithm is trained by a vehicle data server in communication with one or more vehicle event recorders, and downloaded to the vehicle event recorders when the training is complete. In some embodiments, the vehicle characterization is logged and tracked over time, enabling determination of a maintenance item (e.g., an indication that maintenance will be necessary).

In various embodiments, a previous vehicle characterization is deemed to be suspect in the event that: a) sensor readings are outside of template for the previous vehicle characterization type (e.g., z-axis accelerometer traces deviate from template for vehicle type); b) average performance deviates from template (e.g., turning radius from GPS or Gyro data deviates from a template for vehicle type); c) too many or too few lane departure warning (e.g., potentially due to improper vehicle width); and d) vehicle on unexpected road class or at unexpected locations (e.g., small cars at loading docks, ports, large trucks on residential streets, etc.). In various embodiments, in the event that a vehicle characterization is suspect, indicating to reperform or performing again an automatic characterization of a vehicle, or any other appropriate determination of vehicle characterization.

FIG. 1 is a block diagram illustrating an embodiment of a system including a vehicle event recorder. Vehicle event recorder 102 comprises a vehicle event recorder mounted in a vehicle (e.g., a car or truck). In some embodiments, vehicle event recorder 102 includes or is in communication with a set of sensors—for example, video recorders, audio recorders, accelerometers, gyroscopes, vehicle state sensors, proximity sensors, a global positioning system (e.g., GPS), outdoor temperature sensors, moisture sensors, laser line tracker sensors, or any other appropriate sensors. In various embodiments, vehicle state sensors comprise a speedometer, an accelerator pedal sensor, a brake pedal sensor, an engine revolutions per minute (e.g., RPM) sensor, an engine temperature sensor, a headlight sensor, an airbag deployment sensor, driver and passenger seat weight sensors, an anti-locking brake sensor, an engine exhaust sensor, a gear position sensor, a cabin equipment operation sensor, or any other appropriate vehicle state sensors. In some embodiments, vehicle event recorder 102 comprises a system for processing sensor data and detecting events. In some embodiments, vehicle event recorder 102 comprises map data. In some embodiments, vehicle event recorder 102 comprises a system for detecting risky behavior. In various embodiments, vehicle event recorder 102 is mounted on or in vehicle 106 in one of the following locations: the chassis, the front grill, the dashboard, the rear-view mirror, the windshield, ceiling, or any other appropriate location. In some embodiments, vehicle event recorder 102 comprises multiple units mounted in different locations in vehicle 106. In some embodiments, vehicle event recorder 102 comprises a communications system for communicating with network 100. In various embodiments, network 100 comprises a wireless network, a wired network, a cellular network, a Code Division Multiple Access (CDMA) network, a Global System for Mobile Communication (GSM) network, a Long-Term Evolution (LTE) network, a Universal Mobile Telecommunications System (UMTS) network, a Worldwide Interoperability for Microwave Access (WiMAX) network, a Dedicated Short-Range Communications (DSRC) network, a local area network, a wide area network, the Internet, or any other appropriate network. In some embodiments, network 100 comprises multiple networks, changing over time and location. In some embodiments, different networks comprising network 100 comprise different bandwidth cost (e.g., a wired network has a very low cost, a wireless Ethernet connection has a moderate cost, a cellular data network has a high cost). In some embodiments, network 100 has a different cost at different times (e.g., a higher cost during the day and a lower cost at night). Vehicle event recorder 102 communicates with vehicle data server 104 via network 100. Vehicle event recorder 102 is mounted to vehicle 106. In various embodiments, vehicle 106 comprises a car, a truck, a commercial vehicle, or any other appropriate vehicle. Vehicle data server 104 comprises a vehicle data server for collecting events and risky behavior detected by vehicle event recorder 102. In some embodiments, vehicle data server 104 comprises a system for collecting data from multiple vehicle event recorders. In some embodiments, vehicle data server 104 comprises a system for analyzing vehicle event recorder data. In some embodiments, vehicle data server 104 comprises a system for displaying vehicle event recorder data. In some embodiments, vehicle data server 104 is located at a home station (e.g., a shipping company office, a taxi dispatcher, a truck depot, etc.). In various embodiments, vehicle data server 104 is located at a colocation center (e.g., a center where equipment, space, and bandwidth are available for rental), at a cloud service provider, or any at other appropriate location. In some embodiments, events recorded by vehicle event recorder 102 are downloaded to vehicle data server 104 when vehicle 106 arrives at the home station. In some embodiments, vehicle data server 104 is located at a remote location. In some embodiments, events recorded by vehicle event recorder 102 are downloaded to vehicle data server 104 wirelessly. In some embodiments, a subset of events recorded by vehicle event recorder 102 is downloaded to vehicle data server 104 wirelessly. In some embodiments, vehicle event recorder 102 comprises a system for automatically characterizing a vehicle.

Figure 2:
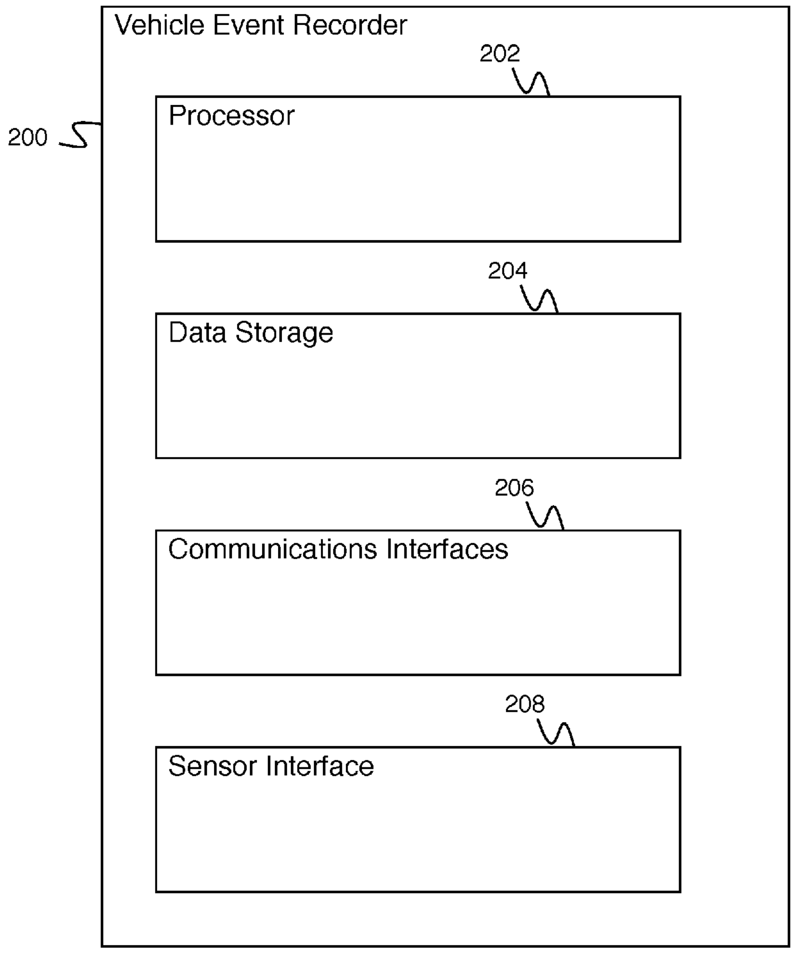
FIG. 2 is a block diagram illustrating an embodiment of a vehicle event recorder.

FIG. 2 is a block diagram illustrating an embodiment of a vehicle event recorder. In some embodiments, vehicle event recorder 200 of FIG. 2 comprises vehicle event recorder 102 of FIG. 1. In the example shown, vehicle event recorder 200 comprises processor 202. Processor 202 comprises a processor for controlling the operations of vehicle event recorder 200, for reading and writing information on data storage 204, for communicating via wireless communications interface 206, and for reading data via sensor interface 208. In various embodiments, processor 202 comprises a processor for determining a vehicle characterization, determining a vehicle identifier, determining a maintenance item, or for any other appropriate purpose. Data storage 204 comprises a data storage (e.g., a random access memory (RAM), a read only memory (ROM), a nonvolatile memory, a flash memory, a hard disk, or any other appropriate data storage). In various embodiments, data storage 204 comprises a data storage for storing instructions for processor 202, vehicle event recorder data, vehicle event data, sensor data, video data, driver scores, or any other appropriate data. In various embodiments, communications interfaces 206 comprises one or more of a GSM interface, a CDMA interface, a LTE interface, a WiFi™ interface, an Ethernet interface, a Universal Serial Bus (USB) interface, a Bluetooth™ interface, an Internet interface, or any other appropriate interface. Sensor interface 208 comprises an interface to one or more vehicle event recorder sensors. In various embodiments, vehicle event recorder sensors comprise an exterior video camera, an exterior still camera, an interior video camera, an interior still camera, a microphone, an accelerometer, a gyroscope, an outdoor temperature sensor, a moisture sensor, a laser line tracker sensor, vehicle state sensors, or any other appropriate sensors. In some embodiments, compliance data is received via sensor interface 208. In some embodiments, compliance data is received via communications interface 206. In various embodiments, vehicle state sensors comprise a speedometer, an accelerator pedal sensor, a brake pedal sensor, an engine revolutions per minute (RPM) sensor, an engine temperature sensor, a headlight sensor, an airbag deployment sensor, driver and passenger seat weight sensors, an anti-locking brake sensor, an engine exhaust sensor, a gear position sensor, a turn signal sensor, a cabin equipment operation sensor, or any other appropriate vehicle state sensors. In some embodiments, sensor interface 208 comprises an on-board diagnostics (OBD) bus (e.g., society of automotive engineers (SAE) J1939, J1708/J1587, OBD-II, CAN BUS, etc.). In some embodiments, vehicle event recorder 200 communicates with vehicle state sensors via the OBD bus.

Figure 3:
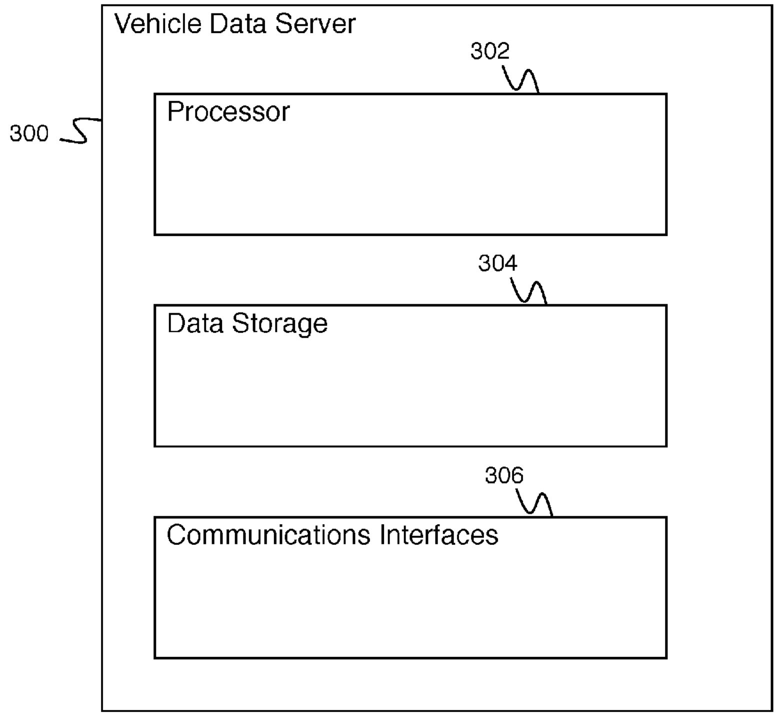
FIG. 3 is a block diagram illustrating an embodiment of a vehicle data server.

FIG. 3 is a block diagram illustrating an embodiment of a vehicle data server. In some embodiments, vehicle data server 300 comprises vehicle data server 104 of FIG. 1. In the example shown, vehicle data server 300 comprises processor 302. In various embodiments, processor 302 comprises a processor for determining driver shifts, determining driver data, determining driver warnings, determining driver coaching information, training a machine learning algorithm, or processing data in any other appropriate way. Data storage 304 comprises a data storage (e.g., a random access memory (RAM), a read only memory (ROM), a nonvolatile memory, a flash memory, a hard disk, or any other appropriate data storage). In various embodiments, data storage 304 comprises a data storage for storing instructions for processor 302, vehicle event recorder data, vehicle event data, sensor data, video data, map data, machine learning algorithm data, or any other appropriate data. In various embodiments, communications interfaces 306 comprises one or more of a GSM interface, a CDMA interface, a WiFi interface, an Ethernet interface, a USB interface, a Bluetooth interface, an Internet interface, a fiber optic interface, or any other appropriate interface.

Figure 4:
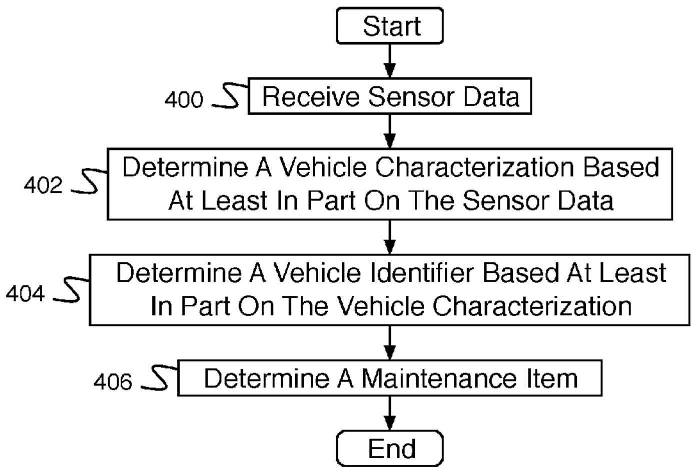
FIG. 4 is a block diagram illustrating an embodiment of a process for automatic characterization of a vehicle.

FIG. 4 is a block diagram illustrating an embodiment of a process for automatic characterization of a vehicle. In some embodiments, the process of FIG. 4 is executed by vehicle event recorder 200 of FIG. 2. In the example shown, in 400, sensor data is received. In various embodiments, sensor data comprises image data, exterior video camera data, exterior still camera data, interior video camera data, interior still camera data, audio data, interior microphone data, exterior microphone data, inertial data, accelerometer data, gyroscope data, outdoor temperature sensor data, moisture sensor data, laser line tracker sensor data, GPS data, compliance data, vehicle state sensor data, or any other appropriate data. In various embodiments, vehicle state sensor data comprises speedometer data, accelerator pedal sensor data, brake pedal sensor data, engine revolutions per minute (RPM) sensor data, engine temperature sensor data, headlight sensor data, airbag deployment sensor data, driver and passenger seat weight sensor data, anti-locking brake sensor data, engine exhaust sensor data, gear position sensor data, turn signal sensor data, cabin equipment operation sensor data, or any other appropriate vehicle state sensor data. In 402, a vehicle characterization is determined based at least in part on the sensor data. In some embodiments, a vehicle characterization comprises a set of vehicle parameters. In various embodiments, the vehicle characterization comprises a physical profile (e.g., a hood profile, a seat profile, a headlight pattern, a view behind the driver, etc.), a mechanical profile (e.g., engine characteristics, a shock response, a turn response, an acceleration response, etc.), an audio profile (e.g., an idle sound, a high RPM sound, a horn sound, etc.), a usage profile (e.g., route data, a maintenance log, a usage log, a driver log, etc.), or any other appropriate vehicle characterization information. In 404, a vehicle identifier is determined based at least in part on the vehicle characterization. In some embodiments, a vehicle identifier is determined using machine learning. In some embodiments, a vehicle identifier is determined using a machine learning algorithm trained on a vehicle data server. In 406, a maintenance item is determined. In some embodiments, determining a maintenance item comprises determining a vehicle change over time. In some embodiments, the maintenance item comprises a maintenance schedule. In some embodiments, the maintenance item comprises a next required maintenance date. In some embodiments, the process of FIG. 4 is cycled after a time period (e.g., with a predetermined cycle frequency, with a selectable cycle frequency, etc.).

Figure 5:
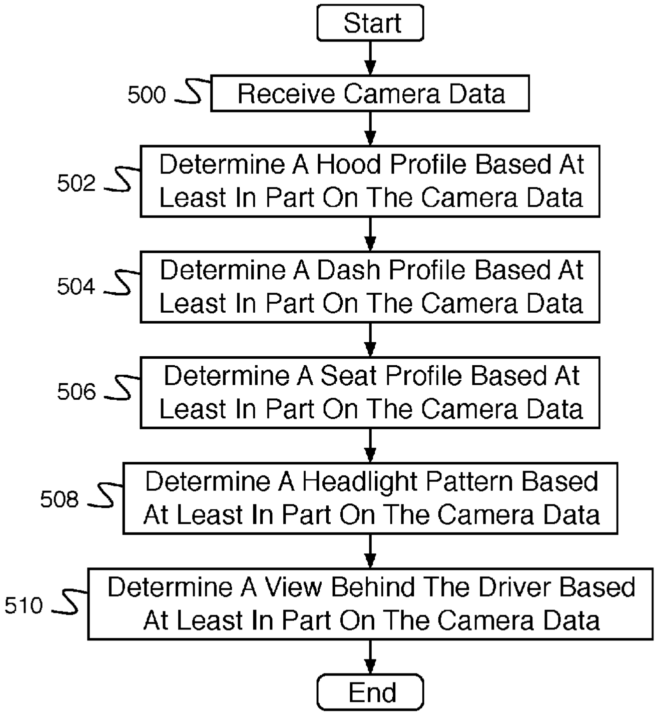
FIG. 5 is a flow diagram illustrating an embodiment of a process for determining a physical profile.

FIG. 5 is a flow diagram illustrating an embodiment of a process for determining a physical profile. In some embodiments, determining a physical profile comprises determining a vehicle characterization. In some embodiments, the process of FIG. 5 implements 402 of FIG. 4. In the example shown, in 500, camera data is received. In various embodiments, camera data comprises exterior camera data, interior camera data, forward-facing camera data, rearward-facing camera data, inward-facing camera data, still camera data, video camera data, or any other appropriate camera data. In 502, a hood profile is determined based at least in part on the camera data. In various embodiments, a hood profile comprises a hood width, a hood height, a hood rise, a hood color, a hood curvature, hood ornament information, or any other appropriate hood profile information. In 504, a dash profile is determined based at least in part on the camera data. In various embodiments, a dash profile comprises a dash width, a dash angle, a dash depth, a dash curvature, or any other appropriate dash profile information. In 506, a seat profile is determined based at least in part on the camera data. In various embodiments, a seat profile comprises a seat width, a seat height, a seat angle, a seat shoulder curvature, a seat headrest shape, a seat back shape, a seat separation, or any other appropriate seat profile information. In 508, a headlight pattern is determined based at least in part on the camera data. In various embodiments, a headlight pattern comprises a headlight angle, a headlight separation, a headlight shape, a headlight color, or any other appropriate headlight pattern information. In 510, a view behind the driver is determined based at least in part on the camera data. In various embodiments, a view behind the driver comprises a view of a closed back of a cab, a view of open road behind the driver, a view of a flatbed trailer, a view of a box trailer, or any other appropriate view.

Figure 6:
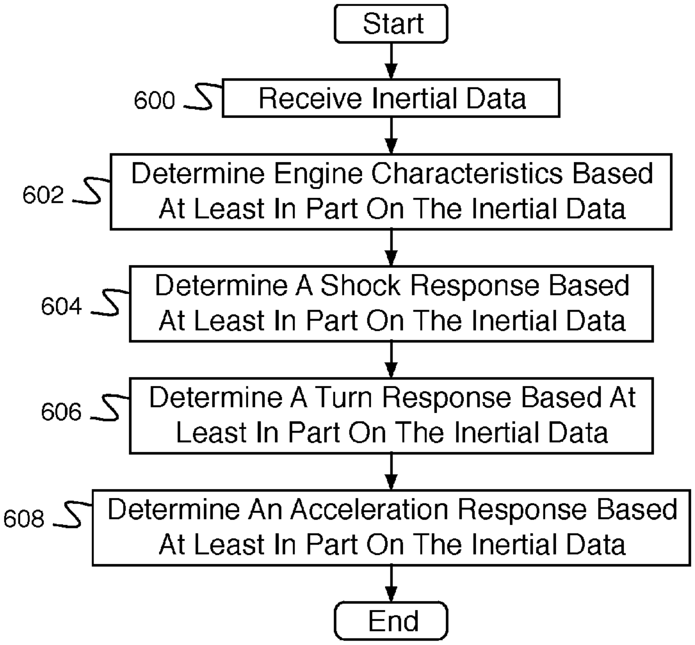
FIG. 6 is a flow diagram illustrating an embodiment of a process for determining a mechanical profile.

FIG. 6 is a flow diagram illustrating an embodiment of a process for determining a mechanical profile. In some embodiments, determining a mechanical profile comprises determining a vehicle characterization. In some embodiments, the process of FIG. 6 implements 402 of FIG. 4. In the example shown, in 600, inertial data is received. In various embodiments, inertial data comprises data from one or more accelerometers (e.g., accelerometers measuring acceleration in different directions, accelerometers in different locations, etc.), data from one or more gyroscopes (e.g., gyroscopes measuring rotation about different axes, gyroscopes in different locations, etc.), a combination of one or more accelerometers and one or more gyroscopes, or any other appropriate inertial sensors. In some embodiments, vehicle state sensor data is received. In 602, engine characteristics are determined based at least in part on the inertial data. In some embodiments, engine characteristics are based at least in part on vehicle state sensor data. In various embodiments, engine characteristics comprise an idle engine vibration pattern, a high ROM engine vibration pattern, an acceleration vibration pattern, or any other appropriate engine characteristics. In 604, a shock response is determined based at least in part on the inertial data. In some embodiments, a shock response is based at least in part on vehicle state sensor data. In various embodiments, a shock response comprises a shock response to a small impulse (e.g., a small impact—for example, hitting a small bump in the road), a shock response to a large impulse (e.g., a large impact—for example, hitting a large pothole), a shock response to a gradual vertical acceleration (e.g., a speed bump), a shock response at low speed, a shock response at high speed, or any other appropriate shock response. In 606, a turn response is determined based at least in part on the inertial data. In some embodiments, a turn response is based at least in part on vehicle state sensor data. In various embodiments, a turn response comprises a turn rate in response to a slow turn, a turn rate in response to a fast turn, a minimum turning radius, or any other appropriate turn response. In 608, an acceleration response is determined based at least in part on the inertial data. In some embodiments, an acceleration response is based at least in part on vehicle state sensor data. In various embodiments, an acceleration response comprises a low acceleration response (e.g., an acceleration response to a low gasoline input), a high acceleration response (e.g., an acceleration response to a high gasoline input), an acceleration gradient response, or any other appropriate acceleration response.

Figure 7:
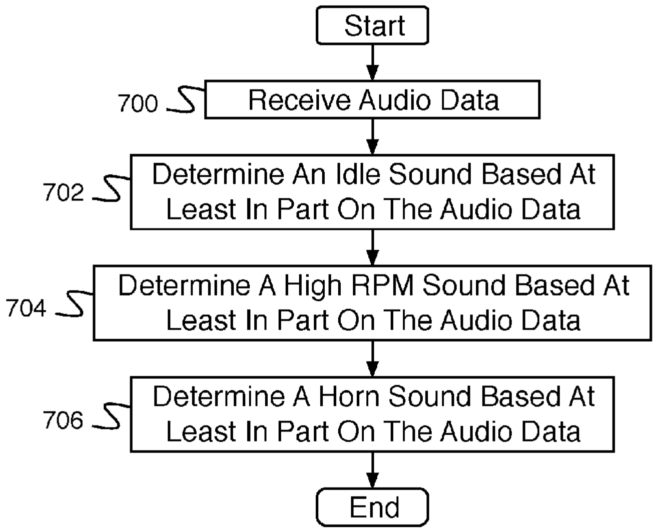
FIG. 7 is a flow diagram illustrating an embodiment of a process for determining an audio profile.

FIG. 7 is a flow diagram illustrating an embodiment of a process for determining an audio profile. In some embodiments, determining an audio profile comprises determining a vehicle characterization. In some embodiments, the process of FIG. 7 implements 402 of FIG. 4. In the example shown, in 700, audio data is received. In various embodiments, audio data comprises interior microphone data, exterior microphone data, front microphone data, rear microphone data, contact microphone data, or any other appropriate microphone data. In some embodiments, vehicle state sensor data is received. In 702, an idle sound is determined based at least in part on the audio data. In some embodiments, an idle sound is determined based at least in part on vehicle state sensor data. In some embodiments, an idle sound comprises a vehicle sound at idle. In some embodiments, determining an idle sound comprises determining a frequency analysis of an idle sound. In 704, a high RPM sound is determined based at least in part on the audio data. In some embodiments, a high RPM sound is determined based at least in part on vehicle state sensor data. In some embodiments, a high RPM sound comprises an engine sound at high RPM. In some embodiments, determining a high RPM sound comprises determining a frequency analysis of a high RPM sound. In 706, a horn sound is determined based at least in part on the audio data. In some embodiments, a horn sound is determined based at least in part on vehicle state sensor data. In some embodiments, determining a horn sound comprises determining a frequency analysis of a horn sound.

Figure 8:
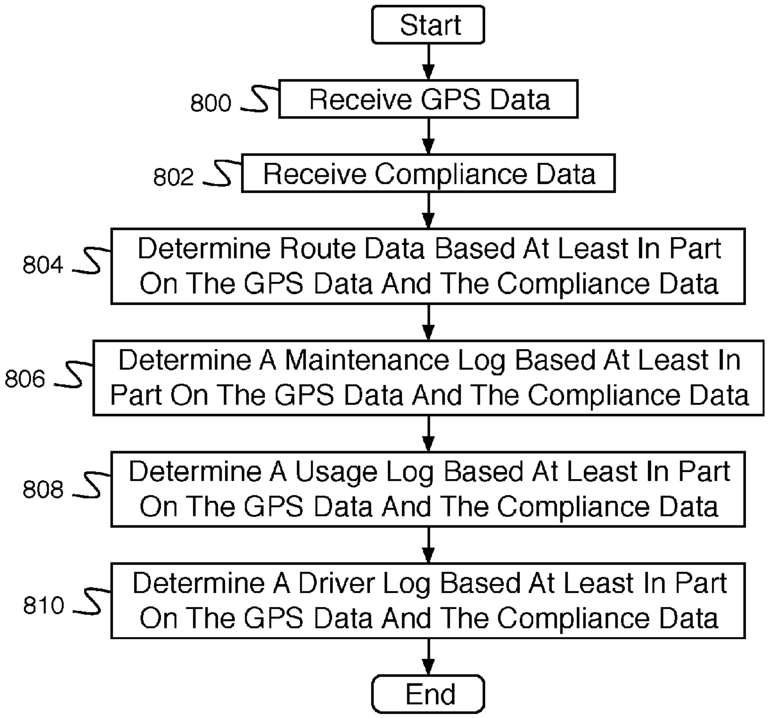
FIG. 8 is a flow diagram illustrating an embodiment of a process for determining a usage profile.

FIG. 8 is a flow diagram illustrating an embodiment of a process for determining a usage profile. In some embodiments, determining a usage profile comprises determining a vehicle characterization. In some embodiments, the process of FIG. 8 implements 402 of FIG. 4. In the example shown, in 800, GPS data is received. In some embodiments, GPS data comprises data describing vehicle position over time. In 802, compliance data is received. In some embodiments, compliance data comprises data describing compliance events over time. In some embodiments, compliance events comprise maintenance compliance events. In 804, route data is determined based at least in part on the GPS data and the compliance data. In some embodiments, route data comprises data describing recent routes. In 806, a maintenance log is determined based at least in part on the GPS data and the compliance data. In some embodiments, a maintenance log comprises data describing recent maintenance data. In 808, a usage log is determined based at least in part on the GPS data and the compliance data. In various embodiments, a usage log describes recent usage types, recent job names, recent vehicle events, or any other appropriate vehicle usage information. In 810, a driver log is determined based at least in part on the GPS data and the compliance data. In some embodiments, a driver log comprises data describing recent drivers.

Figure 9:
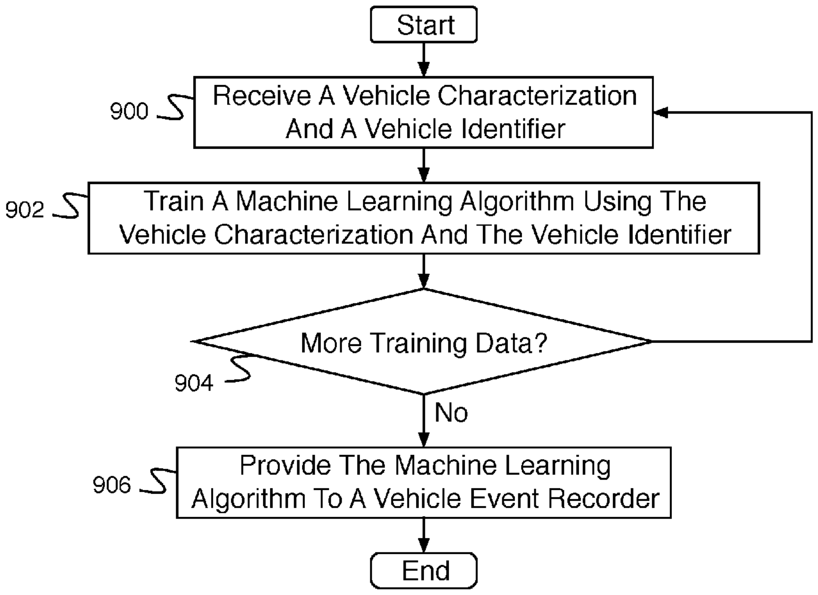
FIG. 9 is a flow diagram illustrating an embodiment of a process for training a machine learning algorithm.

FIG. 9 is a flow diagram illustrating an embodiment of a process for training a machine learning algorithm. In some embodiments, the process of FIG. 9 comprises a process for training a machine learning algorithm for automatic characterization of a vehicle. In some embodiments, the process of FIG. 9 is executed by a vehicle data server (e.g., vehicle data server 300 of FIG. 3). In the example shown, in 900, a vehicle characterization and a vehicle identifier are received. In some embodiments, the vehicle characterization is determined by a vehicle event recorder (e.g., as in 402 of FIG. 4). In some embodiments, the vehicle characterization is determined on the vehicle data server. For example, a video event is received that has audio information and then, on the servers, vehicle characterization is performed such as frequency analysis to determine engine low RPM frequencies. In some embodiments, the vehicle identifier comprises a vehicle identifier known to be correct. In 902, a machine learning algorithm is trained using the vehicle characterization and the vehicle identifier. In some embodiments, as part of training, data pre-processing, including removing extreme values and transforming values, are performed. In 904, it is determined whether there is more training data (e.g., more vehicle characterization and vehicle identifier data for training the machine learning algorithm). In the event it is determined that there is more training data, control passes to 900. In some embodiments, the learning algorithm is online, meaning it continually improves with data and thus never stops learning. In the event it is determined that there is not more training data, control passes to 906. In 906, the machine learning algorithm is provided to a vehicle event recorder.

Figure 10:
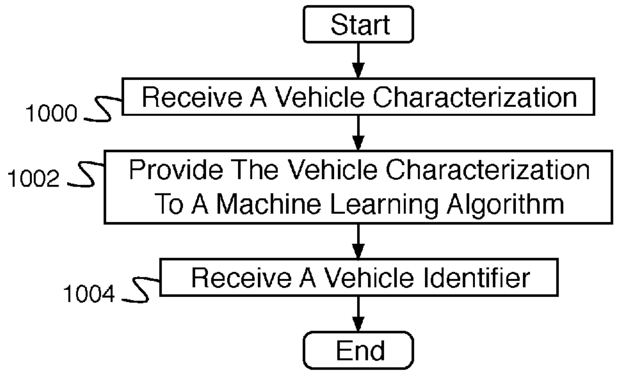
FIG. 10 is a flow diagram illustrating an embodiment of a process for determining a vehicle identifier based at least in part on a vehicle characterization.

FIG. 10 is a flow diagram illustrating an embodiment of a process for determining a vehicle identifier based at least in part on a vehicle characterization. In some embodiments, the process of FIG. 10 implements 404 of FIG. 4. In the example shown, in 1000, a vehicle characterization is received (e.g., a vehicle characterization determined in 402 of FIG. 4). In 1002, the vehicle characterization is provided to a machine learning algorithm. In some embodiments, the machine learning algorithm comprises a machine learning algorithm trained by a vehicle data server. In some embodiments, the machine learning algorithm comprises a machine learning algorithm trained using the process of FIG. 9. In the example shown, in 1004, a vehicle identifier is received.

Figure 11:
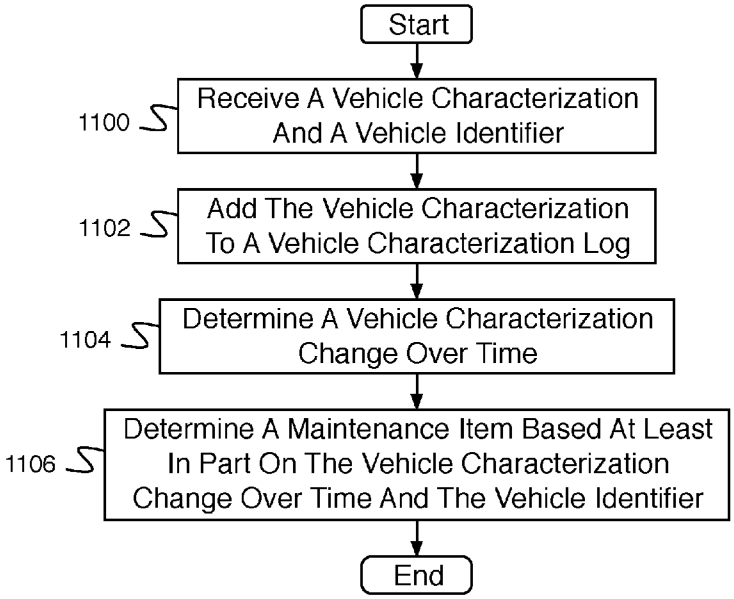
FIG. 11 is a flow diagram illustrating an embodiment of a process for determining a maintenance item.

FIG. 11 is a flow diagram illustrating an embodiment of a process for determining a maintenance item. In some embodiments, the process of FIG. 11 implements 406 of FIG. 4. In the example shown, in 1100, a vehicle characterization and a vehicle identifier are received. In some embodiments, the vehicle characterization comprises a vehicle characterization received in 402 of FIG. 4. In some embodiments, the vehicle identifier comprises a vehicle identifier received in 404 of FIG. 4. In 1102, the vehicle characterization is added to a vehicle characterization log (e.g., tracking the vehicle characterization over time). In 1104, a vehicle characterization change over time is determined. In some embodiments, the vehicle characterization change over time indicates a maintenance item. In 1106, a maintenance item is determined based at least in part on the vehicle characterization change over time and the vehicle identifier. In some embodiments, the maintenance item comprises a maintenance schedule. In some embodiments, the maintenance item comprises a next required maintenance date.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for automatic characterization of a vehicle, comprising:

an input interface for receiving sensor data, wherein the sensor data includes inertial data; and a processor for:

determining a vehicle characterization based at least in part on:

determining at least one engine characteristic including a vibration pattern based at least in part on the inertial data; and determining a response to a road condition based at least in part on the inertial data; and determining a vehicle identifier based at least in part on the vehicle characterization.

2. The system of claim 1, wherein the sensor data comprises image data.

3. The system of claim 1, wherein the sensor data comprises audio data.

4. The system of claim 1, wherein the sensor data comprises inertial data.

5. The system of claim 1, wherein the sensor data comprises GPS data.

6. The system of claim 1, wherein the sensor data comprises compliance data.

7. The system of claim 1, wherein the vehicle characterization comprises a physical profile.

8. The system of claim 7, wherein the physical profile comprises a hood profile, a seat profile, a headlight pattern, or a view behind a driver of the vehicle.

9. The system of claim 1, wherein the vehicle characterization comprises a mechanical profile.

10. The system of claim 9, wherein the mechanical profile comprises engine characteristics, a shock response, a turn response, or an acceleration response.

11. The system of claim 1, wherein the vehicle characterization comprises an audio profile.

12. The system of claim 11, wherein the audio profile comprises an idle sound, a high RPM sound, or a horn sound.

13. The system of claim 1, wherein the vehicle characterization comprises a usage profile.

14. The system of claim 13, wherein the usage profile comprises route data, a maintenance log, a usage log, or a driver log.

15. The system of claim 1, wherein the vehicle identifier is determined by training a machine learning engine with the vehicle characterization and the vehicle identifier.

16. The system of claim 1, wherein the processor is further for determining a maintenance item.

17. The system of claim 16, wherein determining a maintenance item comprises determining a vehicle characterization change over time.

18. The system of claim 17, wherein the maintenance item comprises a maintenance schedule.

19. A method for automatic characterization of a vehicle, comprising:

receiving sensor data, wherein the sensor data includes inertial data;

determining, using a processor, a vehicle characterization based at least in part on:

determining at least one engine characteristic including a vibration pattern based at least in part on the inertial data; and determining a response to a road condition based at least in part on the inertial data; and determining a vehicle identifier based at least in part on the vehicle characterization.

20. A computer program product embodied in a non-transitory computer readable storage medium and comprising computer instructions for:

receiving sensor data, wherein the sensor data includes inertial data;

determining a vehicle characterization based at least in part on:

determining at least one engine characteristic including a vibration pattern based at least in part on the inertial data; and determining a response to a road condition based at least in part on the inertial data; and determining a vehicle identifier based at least in part on the vehicle characterization.

* * * * *